United States Patent
Wang et al.

(10) Patent No.: US 12,531,649 B2
(45) Date of Patent: Jan. 20, 2026

(54) POLARIZATION RECONFIGURATION METHOD AND COMMUNICATION APPARATUS

(71) Applicant: Huawei Technologies Co., Ltd., Shenzhen (CN)

(72) Inventors: Bin Wang, Hangzhou (CN); Yunfei Qiao, Hangzhou (CN); Jianwei Zhou, Hangzhou (CN); Xueliang Shi, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 396 days.

(21) Appl. No.: 18/170,951

(22) Filed: Feb. 17, 2023

(65) Prior Publication Data

US 2023/0216602 A1  Jul. 6, 2023

Related U.S. Application Data

(63) Continuation of application No. PCT/CN2021/108628, filed on Jul. 27, 2021.

(30) Foreign Application Priority Data

Aug. 19, 2020 (CN) ............ 202010835015.5

(51) Int. Cl.
*H04J 14/06* (2006.01)
*H04B 7/10* (2017.01)

(52) U.S. Cl.
CPC ............ *H04J 14/06* (2013.01); *H04B 7/10* (2013.01)

(58) Field of Classification Search
CPC ......... H04J 14/06; H04B 7/10; H04W 24/02; H04W 36/00; H04W 36/16; H04W 72/04; H04W 84/06; H04W 36/0055; H04W 36/165; H04W 72/046; H04W 72/23
USPC ........................................... 370/316
See application file for complete search history.

(56) References Cited

U.S. PATENT DOCUMENTS

| | | | |
|---|---|---|---|
| 9,876,545 B2 * | 1/2018 | Cordeiro | H04B 7/0452 |
| 2013/0182750 A1 * | 7/2013 | Zhang | H04B 7/0456 |
| | | | 375/219 |
| 2018/0063693 A1 * | 3/2018 | Chakraborty | H04W 8/005 |

FOREIGN PATENT DOCUMENTS

| | | |
|---|---|---|
| CN | 101204107 A | 6/2008 |
| CN | 107949066 A | 4/2018 |
| CN | 108988925 A | 12/2018 |
| CN | 110289901 A | 9/2019 |

* cited by examiner

*Primary Examiner* — Kwang B Yao
*Assistant Examiner* — Syed M Bokhari
(74) *Attorney, Agent, or Firm* — SLATER MATSIL, LLP

(57) ABSTRACT

This application provides a polarization reconfiguration method and a communication apparatus. A network device may send polarization pre-switching indication information to appropriately schedule and adjust user polarization within a base station or between base stations. A terminal device may switch a polarization mode in advance based on the polarization pre-switching indication information sent by the network device.

14 Claims, 6 Drawing Sheets

Four-color multiplexing

POLARIZATION RECONFIGURATION METHOD AND COMMUNICATION APPARATUS

CROSS-REFERENCE TO RELATED APPLICATIONS

This application is a continuation of International Application No. PCT/CN2021/108628, filed on Jul. 27, 2021, which claims priority to Chinese Patent Application No. 202010835015.5, filed on Aug. 19, 2020. The disclosures of the aforementioned applications are hereby incorporated by reference in their entireties.

TECHNICAL FIELD

This application relates to satellite networks, and more specifically, to a polarization reconfiguration method and a communication apparatus.

BACKGROUND

With development of information technologies, more urgent requirements are imposed on high efficiency, mobility, and diversity of communication. Currently, satellites play an irreplaceable role in some important fields, such as space communication, aeronautical communication, marine communication, and military communication. Satellite communication has features of a long communication distance, a large coverage area, flexible networking, and the like, and can provide services for both fixed terminals and various mobile terminals.

To avoid interference between a satellite beam and a satellite system, utilization of a satellite spectrum can be greatly improved through polarization multiplexing. FIG. 1 shows typical four-color beam multiplexing, including frequency multiplexing and polarization multiplexing technologies. Left hand circular polarization (LHCP) or right hand circular polarization (RHCP) is used in all conventional satellite networks. Vertical linear polarization or cross linear polarization is also used in a few satellite communication networks.

In the conventional technology, a terminal device performs measurement and demodulation on a plurality of beams of a neighboring cell to obtain a polarization indication message sent by a network device of the neighboring cell. For a fully polarized terminal device, measurement overheads are increased to some extent. For a reconstructed polarized terminal, a hardware polarization attribute of the terminal device needs to be adjusted to obtain an indication message of a neighboring cell. Due to a switching delay, a user cannot track a polarization feature change of a cell or a neighboring cell in a timely manner, causing interruption of an ongoing service, cell re-searching, and repeated synchronization and access processes.

SUMMARY

This application provides a polarization reconfiguration method, to appropriately schedule and adjust user polarization within a base station or between base stations, so as to avoid service interruption caused by a polarization switching delay, improve an inter-cell interference coordination capability, and further increase a network transmission capacity.

According to a first aspect, a polarization reconfiguration method is provided. The method includes: A terminal device receives a first message sent by a network device, where the first message includes first indication information, and the first indication information includes information about second polarization; and the terminal device switches from first polarization to the second polarization based on the first indication information, where the first polarization is a polarization mode in which the terminal device currently operates.

In the foregoing technical solution, the terminal device may obtain, in advance, polarization pre-switching indication information sent by the network device, and perform polarization switching in advance, to avoid service interruption, cell re-searching, and repeated synchronization and access processes of a terminal device due to a polarization switching delay in the conventional technology.

With reference to the first aspect, in some implementations of the first aspect, that the first indication information is used to indicate information about second polarization includes: The information about the second polarization is used to indicate that the second polarization is a polarization mode orthogonal to the first polarization; the information about the second polarization is used to indicate that the second polarization is a polarization mode of a type different from that of the first polarization; the information about the second polarization is used to indicate an index of the second polarization mode; or the information about the second polarization is used to indicate that the second polarization is a polarization mode the same as the first polarization.

With reference to the first aspect, in some implementations of the first aspect, the method further includes: A time offset between a time unit in which the terminal device receives the first message and a time unit in which the terminal device validates the first indication information is L time units, where L is greater than or equal to 0.

With reference to the first aspect, in some implementations of the first aspect, the first message further includes second indication information, and the second indication information is used to indicate a time offset L for the terminal device to validate the first indication information.

In the foregoing technical solution, the time unit in which the first indication information is validated may be determined more flexibly by using the second indication information.

With reference to the first aspect, in some implementations of the first aspect, the first message includes any one of the following messages: a radio resource control RRC message, a system information block SIB message, downlink control information DCI, and a medium access control control element MAC CE message.

With reference to the first aspect, in some implementations of the first aspect, before the terminal device receives the first message sent by the network device, the method further includes: The terminal device determines a first capability message, where the first capability message includes a polarization mode supported by the terminal device; and the terminal device sends the first capability message to the network device, where the first capability message includes the polarization mode supported by the terminal device.

With reference to the first aspect, in some implementations of the first aspect, before the terminal device sends the first capability message to the network device, the method further includes: The terminal device receives a capability negotiation message sent by the network device, where the capability negotiation message is used to indicate the terminal device to report the polarization mode supported by the terminal device; and the terminal device sends the first capability message to the network device based on the capability negotiation message.

With reference to the first aspect, in some implementations of the first aspect, the first indication information is sent upon triggering by an event.

According to a second aspect, this application provides a polarization reconfiguration method. The method includes: A network device determines a first message, where the first message includes first indication information, the first indication information includes information about second polarization, the second polarization is a polarization mode the same as or different from first polarization, and the first polarization is a polarization mode in which a terminal device currently operates; and the network device sends the first message to the terminal device, where the first message includes the first indication information, and the first indication information includes the information about the second polarization.

With reference to the second aspect, in some implementations of the second aspect, that the first indication information includes information about second polarization includes: The information about the second polarization is used to indicate that the second polarization is a polarization mode orthogonal to the first polarization; the information about the second polarization is used to indicate that the second polarization is a polarization mode of a type different from that of the first polarization; or the information about the second polarization is used to indicate an index of the second polarization mode, where the first polarization is a polarization mode in which the terminal device currently operates.

With reference to the second aspect, in some implementations of the second aspect, the first message further includes second indication information, and the second indication information is used to indicate that a time offset between a time unit in which the terminal device receives the first message and a time unit in which the terminal device validates the first indication information is L time units, where L is greater than or equal to 0.

With reference to the second aspect, in some implementations of the second aspect, the first message includes any one of the following messages: a radio resource control RRC message, a system information block SIB message, downlink control information DCI, and a medium access control control element MAC CE message.

With reference to the second aspect, in some implementations of the second aspect, before the network device sends the first message to the terminal device, the method further includes: The network device receives a first capability message sent by the terminal device, where the first capability message includes a polarization mode supported by the terminal device.

With reference to the second aspect, in some implementations of the second aspect, before the network device receives the first capability message sent by the terminal device, the method further includes: The network device sends a capability negotiation message to the terminal device, where the capability negotiation message is used to indicate the terminal device to report the polarization mode supported by the terminal device; and the network device receives the first capability message sent by the terminal device based on the capability negotiation message.

With reference to the second aspect, in some implementations of the second aspect, the first indication information is sent upon triggering by an event.

For technical effects of the second aspect or the implementations of the second aspect, refer to the descriptions of the technical effects of the first aspect or the implementations of the first aspect. Details are not described herein again.

According to a third aspect, a communication apparatus is provided. The communication apparatus has a function of implementing the method in any one of the first aspect or the possible implementations of the first aspect. The function may be implemented by hardware, or may be implemented by hardware executing corresponding software. The hardware or the software includes one or more units corresponding to the foregoing function, for example, a processing unit.

According to a fourth aspect, this application provides a communication apparatus. The communication apparatus has a function of implementing the method in any one of the second aspect or the possible implementations of the second aspect. The function may be implemented by hardware, or may be implemented by hardware executing corresponding software. The hardware or the software includes one or more units corresponding to the foregoing function, for example, a processing unit, a receiving unit, and a sending unit.

According to a fifth aspect, this application provides a communication device, including at least one processor. The at least one processor is coupled to at least one memory. The at least one memory is configured to store computer programs or instructions. The at least one processor is configured to invoke the computer programs or instructions from the at least one memory and run the computer programs or instructions, so that the communication device performs the method in any one of the first aspect or the possible implementations of the first aspect.

In an example, the communication device may be a terminal device.

According to a sixth aspect, this application provides a communication device, including at least one processor. The at least one processor is coupled to at least one memory. The at least one memory is configured to store computer programs or instructions. The at least one processor is configured to invoke the computer programs or instructions from the at least one memory and run the computer programs or instructions, so that the communication device performs the method in any one of the second aspect or the possible implementations of the second aspect.

In an example, the communication device may be a network device.

According to a seventh aspect, this application provides a terminal device, including a processor, a memory, and a transceiver. The memory is configured to store a computer program. The processor is configured to invoke and run the computer program stored in the memory, and control the transceiver to send or receive a signal, so that the communication device performs the method in any one of the first aspect or the possible implementations of the first aspect.

According to an eighth aspect, this application provides a network device, including a processor, a memory, and a transceiver. The memory is configured to store a computer program. The processor is configured to invoke and run the computer program stored in the memory, and control the transceiver to send or receive a signal, so that the communication device performs the method in any one of the second aspect or the possible implementations of the second aspect.

According to a ninth aspect, this application provides a communication apparatus, including a processor and a communication interface. The communication interface is configured to receive a signal and transmit the received signal to the processor. The processor processes the signal, so that the communication apparatus performs the method in any one of the first aspect or the possible implementations of the first aspect.

According to a tenth aspect, this application provides a communication apparatus, including a processor and a communication interface. The communication interface is configured to receive a signal and transmit the received signal to the processor. The processor processes the signal, so that the communication apparatus performs the method in any one of the second aspect or the possible implementations of the second aspect.

Optionally, the communication interface may be an interface circuit, an input/output interface, or the like, and the processor may be a processing circuit, a logic circuit, or the like.

Optionally, the communication apparatus according to the ninth aspect or the tenth aspect may be a chip or an integrated circuit.

According to an eleventh aspect, this application provides a computer-readable storage medium. The computer-readable storage medium stores computer instructions. When the computer instructions are run on a computer, the method in any one of the first aspect or the possible implementations of the first aspect is performed.

According to a twelfth aspect, this application provides a computer-readable storage medium. The computer-readable storage medium stores computer instructions. When the computer instructions are run on a computer, the method in any one of the second aspect or the possible implementations of the second aspect is performed.

According to a thirteenth aspect, this application provides a computer program product. The computer program product includes computer program code. When the computer program code is run on a computer, the method in any one of the first aspect or the possible implementations of the first aspect is performed.

According to a fourteenth aspect, this application provides a computer program product. The computer program product includes computer program code. When the computer program code is run on a computer, the method in any one of the second aspect or the possible implementations of the second aspect is performed.

According to a fifteenth aspect, this application provides a wireless communication system, including the terminal device according to the seventh aspect and/or the network device according to the eighth aspect.

DETAILED DESCRIPTION OF ILLUSTRATIVE EMBODIMENTS

The following describes technical solutions of this application with reference to the accompanying drawings.

The technical solutions of this application may be used in various communication systems, for example, a global system for mobile communications (GSM) system, a code division multiple access (CDMA) system, a wideband code division multiple access (WCDMA) system, general packet radio service (GPRS), a long term evolution (LTE) system, an LTE frequency division duplex (FDD) system, LTE time division duplex (TDD), a universal mobile telecommunications system (UMTS), a worldwide interoperability for microwave access (WiMAX) communication system, a 5th generation (5G) system, new radio (NR), a future mobile communication system, and non-terrestrial network (NTN) systems such as a satellite communication system and high altitude platform station (HAPS) communication. In addition, the technical solutions of this application may be further used in a communication system obtained by integrating the satellite communication system with the foregoing conventional mobile communication system. This is not specifically limited in this application.

Figure 2:
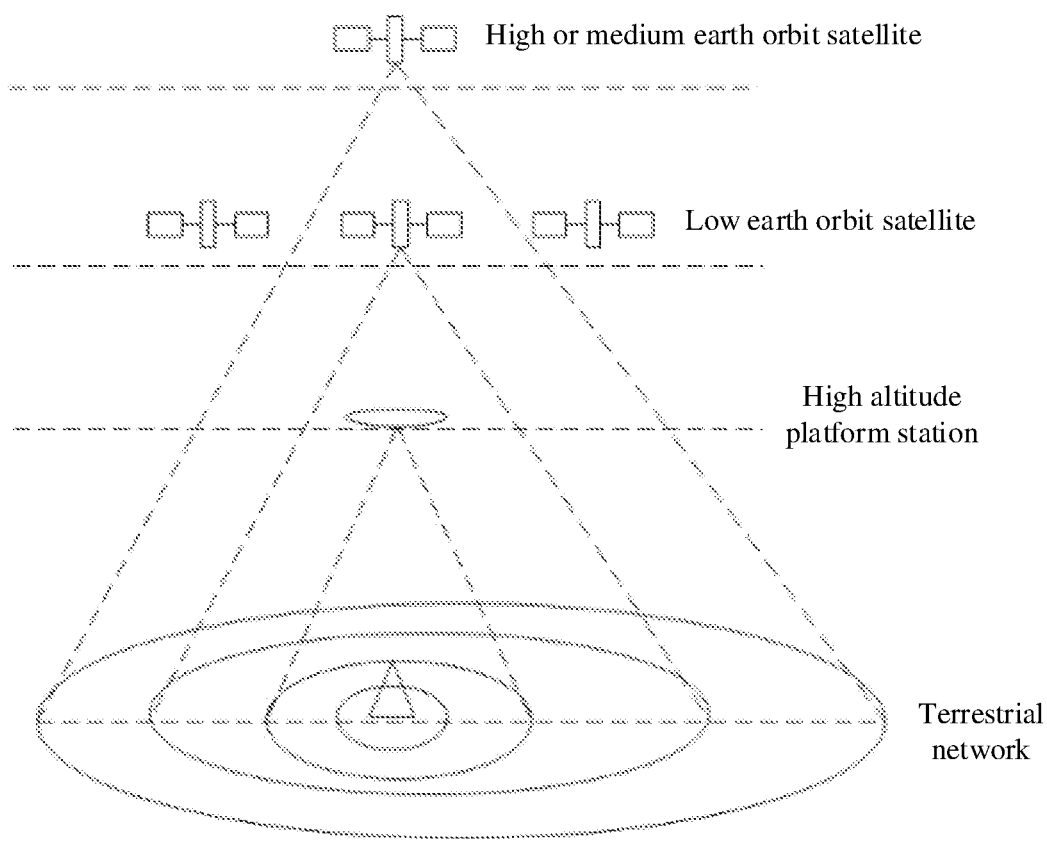
FIG. 2 shows an architecture of a communication system to which an embodiment of this application is applicable.

FIG. 2 shows an architecture of a communication system to which an embodiment of this application is applicable. As shown in FIG. 2, the communication system is a satellite communication system with one or more orbits (for example, a geostationary earth orbit (GEO), a medium earth orbit (MEO), or a low earth orbit (LEO)) or a space-earth integrated network architecture constituted a plurality of non-terrestrial networks that include but are not limited to a satellite, a high altitude platform station, an airship, an unmanned aerial vehicle communication system and that perform mobile communication with the ground, and provides wide-area coverage communication services for terrestrial terminals. The satellite may be a non-geostationary earth orbit (NGEO) satellite or a geostationary earth orbit (GEO) satellite. A network device mentioned in embodiments of this application may be a satellite, or may be a satellite base station, or a network-side device mounted on a satellite.

A terminal device mentioned in embodiments of this application includes various devices with a wireless communication function, for example, a handheld device, a vehicle-mounted device, a wearable device, a computing device, or another processing device connected to a wireless modem; and may be specifically user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. Alternatively, the terminal device may be a satellite phone, a cellular phone, a smartphone, a wireless data card, a wireless modem, a machine type communication device, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a terminal device in a 5G network or a future communication network, or the like.

Figure 1:
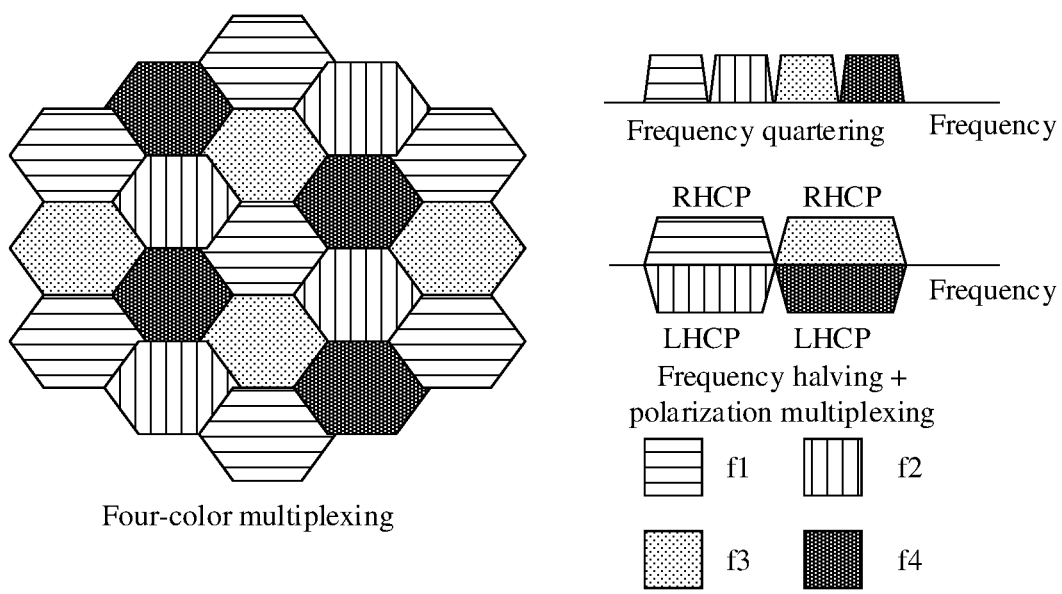
FIG. 1 is a schematic diagram of typical four-color beam multiplexing.

In an existing terrestrial LTE/NR network, a gNB mainly uses linear polarization for signal transmission. Specifically, the gNB sends both a horizontal polarization signal and a vertical polarization (or ±45 linear polarization) signal, and a terminal device receives both the foregoing two polarization signals, to obtain a multiplexing gain. In a satellite communication network, a fixed polarization multiplexing method is commonly used, as shown in FIG. 1, and adjacent beams in a satellite that are likely to cause strong interference are allocated in different polarization modes according to a specific principle.

Figure 3:
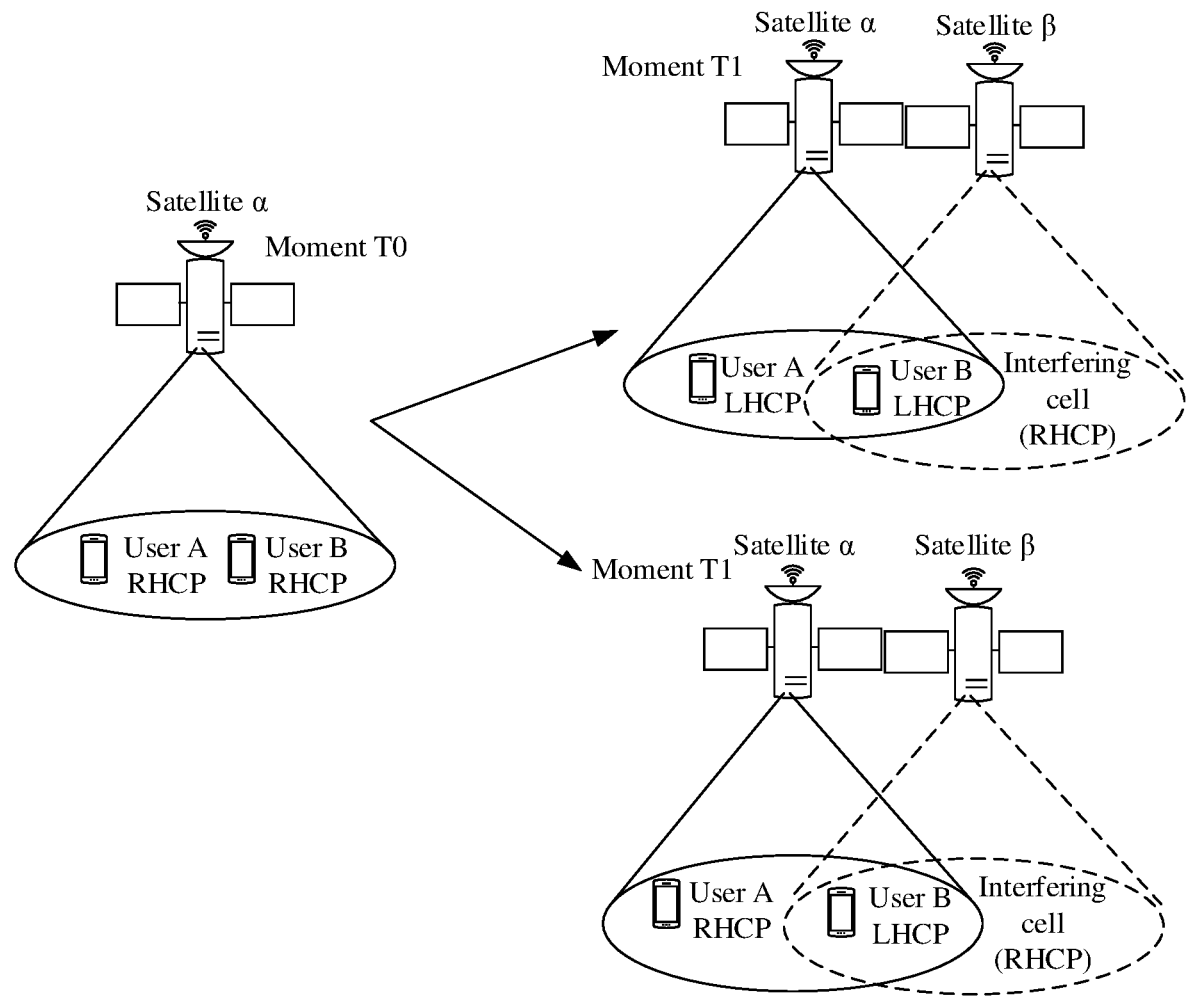
FIG. 3 is a schematic diagram of user polarization adjustment performed when burst interference occurs within a satellite cell or between satellite cells.

For example, FIG. 3 is a schematic diagram of user polarization adjustment performed when burst interference occurs within a satellite cell or between satellite cells. As shown in FIG. 3, at an original moment T0, a user A and a user B under a satellite a and a satellite beam use same polarization, for example, RHCP. At a moment T1, beams of satellites β that come from a same constellation or different constellations use the same RHCP polarization as that used by the original beam, and the original satellite a is unable to operate due to interference. Both the user A and the user B in a cell need to be switched to the LHCP; or only polarization of the user B subject to interference is switched to the LHCP, and a polarization feature of the user A remains unchanged.

Figure 4:
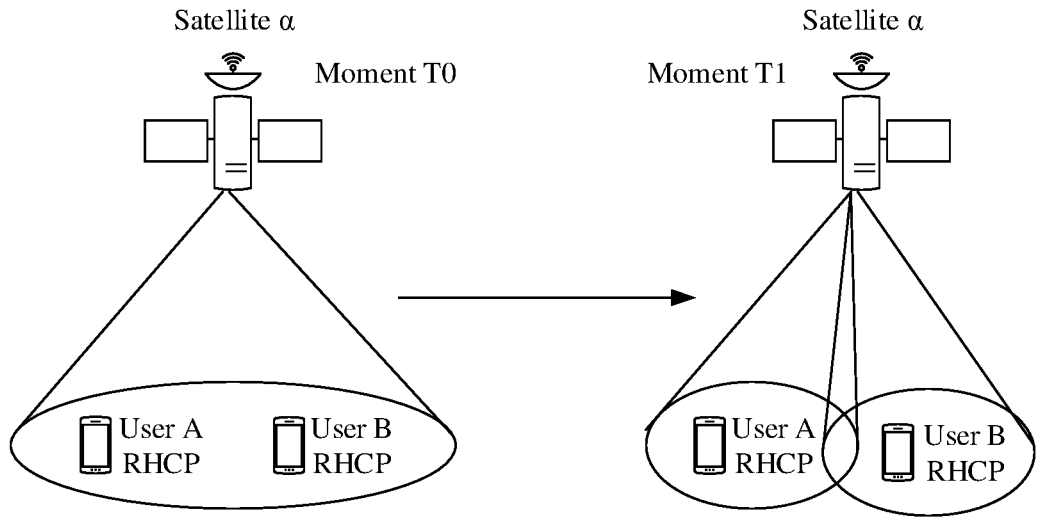
FIG. 4 is a schematic diagram of user polarization adjustment performed when a network schedules and optimizes resources for a base station.

Alternatively, FIG. 4 is a schematic diagram of user polarization adjustment performed when a network schedules and optimizes resources for a base station. As shown in FIG. 4, when a capacity requirement of a region covered by an original satellite a changes, two narrow beams with higher gains need to be used for communication coverage. In this case, strong interference occurs if different users under the two beams use same polarization. A user A and a user B need to use different polarization to reduce interference. For example, a polarization feature of the user A may remain unchanged, and a polarization feature of the user B may be switched to LHCP.

With development of large-scale satellite constellation technologies and space-earth integrated network technologies, a future network is in a form of a heterogeneous network including a plurality of satellite networks with same or different orbits in combination with a terrestrial network, but does not exist as a single satellite network. Contention for space spectra and orbit resources becomes increasingly intense, and interference coordination and optimization within a system or between systems is a major issue in an integrated heterogeneous network. Likewise, with a change of a capacity requirement, corresponding changes and resource scheduling and reconstruction also need to be performed in resource allocation of a satellite communication network according to a user requirement, to maximize resource revenue.

The technical solutions of this application are described below.

Figure 5:
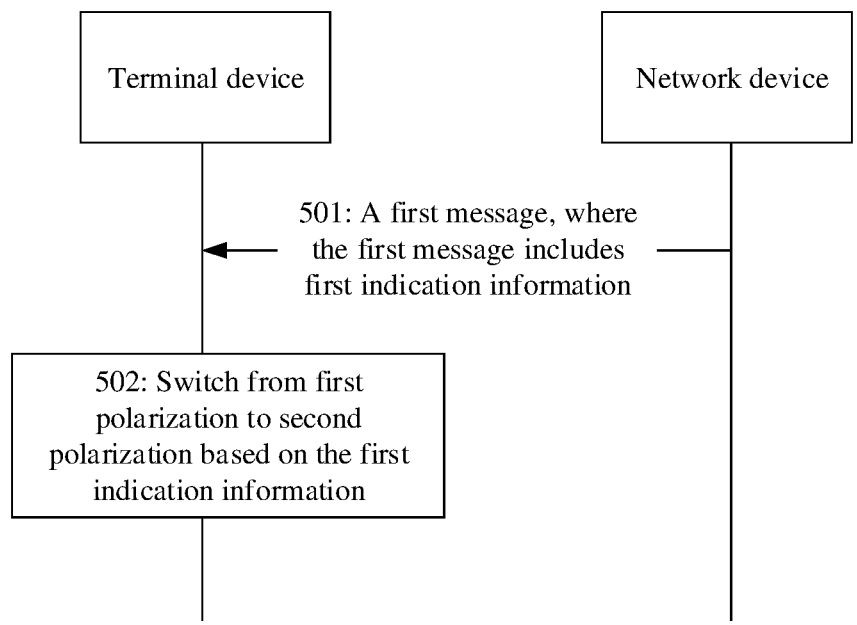
FIG. 5 is a schematic diagram of a polarization reconfiguration method according to this application.

FIG. 5 is a schematic diagram of a polarization reconfiguration method according to this application.

501: A terminal device receives a first message sent by a network device.

Correspondingly, the network device sends the first message to the terminal device, where the first message includes first indication information, and the first indication information includes information about second polarization, to indicate the terminal device to switch from a polarization mode in which the terminal device currently operates (that is, a first polarization mode) to the second polarization mode.

Optionally, a method for indicating switching by the first indication information may be an absolute indication method or a relative indication method.

(1) Relative indication method: The network device may indicate, based on 1 bit (1 or 0), the information about the second polarization to which the terminal device needs to switch.

For example, 0 indicates that the second polarization is a polarization mode orthogonal to the first polarization. For example, when the first polarization is left hand circular polarization, the first indication information indicates that the second polarization to which the terminal device needs to switch is right hand circular polarization; or when the first polarization is horizontal polarization, the first indication information indicates that the second polarization to which the terminal device needs to switch is vertical polarization.

1 indicates that the second polarization is a polarization mode of a type different from that of the first polarization (to be specific, the terminal device switches between circular polarization and linear polarization or cross polarization). For example, when the first polarization is left hand circular polarization, the first indication information indicates that the second polarization to which the terminal device needs to switch is linear polarization; or when the first polarization is right hand circular polarization, the first indication information indicates that the second polarization to which the terminal device needs to switch is cross polarization; or when the first polarization is left hand circular polarization, the first indication information indicates that the second polarization to which the terminal device needs to switch is cross polarization; or when the first polarization is right hand circular polarization, the first indication information indicates that the second polarization to which the terminal device needs to switch is linear polarization.

Optionally, when the method for indicating switching by the first indication information is the relative indication method, the first information is sent to the terminal device in an event-triggered manner. For example, sending of the first indication information is triggered when the network device needs to reconstruct coverage, the network device is subject to interference, or the network device needs to switch a beam.

(2) Absolute indication method: The network device may indicate, based on 1 bit or a plurality of bits, an index of the second polarization mode to which the terminal device needs to switch.

For example, 0 means switching to left hand circular polarization, 1 means switching to right hand circular polarization, 2 means switching to horizontal polarization, 3 means switching to vertical polarization, and 4 means switching to 45° cross polarization.

It should be noted that, in some cases, the second polarization may be alternatively a polarization mode the same as the first polarization. This is not specifically limited in this application.

Optionally, when the method for indicating switching by the first indication information is the absolute indication method, the first indication information may be sent to the terminal device based on a preset periodicity, or may be sent to the terminal device in an event-triggered manner.

Optionally, the first message may be any one of the following messages: a system information block (SIB) (including but not limited to a SIB 3 or a SIB 4), a radio resource control (RRC) message, downlink control information (DCI), and a medium access control control element (MAC CE) message.

It should be noted that, when the first message is a DCI message, an original DCI field is an N-bit 0/1 sequence, and 1 bit needs to be added to the original DCI message to carry the first indication information.

502: The terminal device switches from the first polarization to the second polarization based on the first indication information.

Optionally, the first message further includes second indication information, and the second indication information is used to indicate a time offset L for the terminal device to validate the first indication information, where L is greater than or equal to 0. For example, if the terminal device receives the first message in a slot n, the terminal device validates the first indication information in a slot (n+L) based on the second indication information, that is, switches from the first polarization to the second polarization in the slot (n+L).

Figure 6:
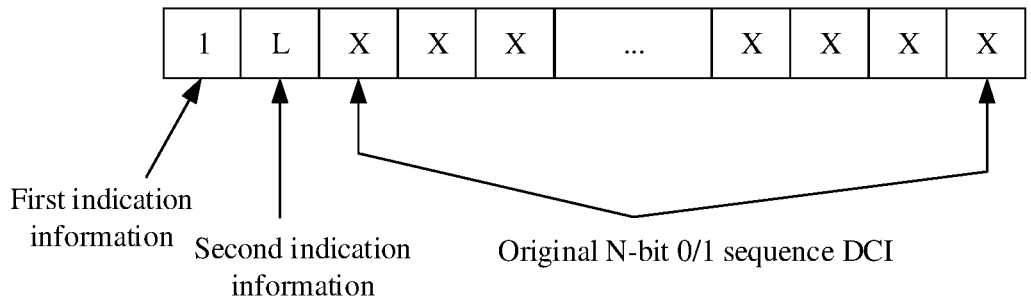
FIG. 6 is a schematic diagram of transmitting, by a network device, first indication information and second indication information by using a DCI message according to this application.

It should be noted that, when the first message is a DCI message, an original DCI field is an N-bit 0/1 sequence, and another 1 bit may be added to the original DCI message to carry the second indication information. FIG. 6 is a schematic diagram of transmitting, by a network device, first indication information and second indication information by using a DCI message according to this application.

Optionally, when the first message is a DCI message, an expression of a time unit in which the terminal device validates the first indication information based on the second indication information is as follows:

$$\left\lfloor n \cdot \frac{2^{\mu_{PDSCH}}}{2^{\mu_{PDCCH}}} \right\rfloor + L,$$

where $\lfloor \cdot \rfloor$ indicates rounding down, n is a slot in which the DCI message is received, $\mu_{PDSCH}$ and $\mu_{PDCCH}$ are a physical downlink shared channel (PDSCH) subcarrier spacing and a physical downlink control channel (PDCCH) subcarrier spacing respectively, and L is a time offset for validating the first indication information.

Optionally, when the first message does not include the second indication information, a requirement for a polarization mode switching time threshold of the terminal device may be agreed upon by using a protocol requirement, or the terminal device validates the first indication information in a nearest slot after receiving the first indication information in the slot n.

Optionally, in 503, before the terminal device receives the first message sent by the network device (that is, before 501), the method further includes: The terminal device sends a first capability message to the network device, where the first capability message includes a parameter of a polarization feature supported by the terminal device. For example, the first capability message may be added to a capability (category) table of the terminal device. In this way, the network device may perform a corresponding polarization change indication to the terminal device based on the first capability message reported by the terminal device, to improve an inter-cell interference coordination capability more effectively.

Optionally, the parameter of the polarization feature supported by the terminal device may be added to an rf-parameters subset sequence table in a UE-NR-Capability set, and is used to describe a category of the polarization feature supported by the terminal device. Table 1 shows capability support statuses for left hand circular polarization (LHCP), right hand circular polarization (RHCP), horizontal (horizontal) polarization, vertical (vertical) polarization, cross polarization, and the like.

TABLE 1

| Polarization mode | Terminal capability (whether a polarization mode is supported) | Whether a capability is optional |
|---|---|---|
| RHCP | Supported/Not supported | Optional |
| LHCP | Supported/Not supported | Optional |
| Horizontal | Supported/Not supported | Optional |
| Vertical | Supported/Not supported | Optional |
| Cross | Supported/Not supported | Optional |

Optionally, the terminal device may periodically report the first capability message to the network device.

Optionally, the network device may alternatively send a capability negotiation message to the terminal device, to indicate the terminal device to report the first capability message or a polarization mode supported by the terminal device.

In an example, this application further provides a method for transmitting polarization switching indication information (that is, the first indication information) between satellite cells. For example, between satellite cells, polarization switching indication information may be transmitted from a local cell to a target cell by using an XnAP message, to improve an inter-cell interference coordination capability. A sender source satellite sends polarization switching indication information, and a receiver target satellite performs corresponding polarization adjustment on a target beam based on the indication information. For the polarization switching indication information and time offset indication information, refer to the foregoing descriptions. Details are not described again. For example, a format of the polarization switching indication message may be shown in Table 2.

TABLE 2

| Parameter name | Source satellite ID | Target satellite ID | Target satellite beam ID | Polarization switching indication | Time offset indication (optional) |
|---|---|---|---|---|---|
| Polarization switching indication information | 2 | 1 | 1 | (LHCP, RHCP, . . . ) | L |

The polarization reconfiguration method provided in this application is described above in detail. A communication apparatus provided in this application is described below.

Figure 7:
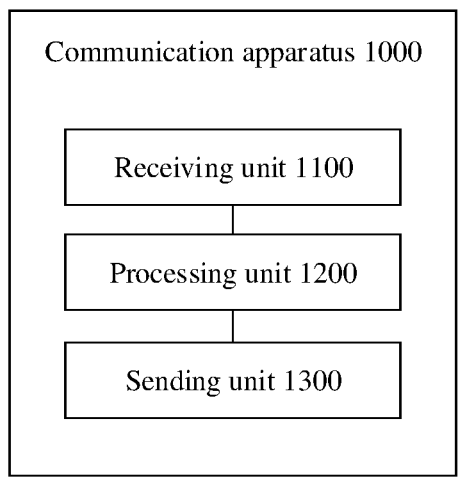
FIG. 7 is a schematic block diagram of a communication apparatus 1000 according to this application.

FIG. 7 is a schematic block diagram of a communication apparatus 1000 according to this application. As shown in FIG. 7, the communication apparatus 1000 includes a receiving unit 1100 and a processing unit 1200.

The receiving unit 1100 is configured to receive a first message sent by a network device, where the first message includes first indication information, and the first indication information includes information about second polarization.

The processing unit 1200 is configured to switch from first polarization to the second polarization based on the first indication information, where the first polarization is a polarization mode in which a terminal device currently operates.

Optionally, in an embodiment, that the first indication information is used to indicate information about second polarization includes: The information about the second polarization is used to indicate that the second polarization is a polarization mode orthogonal to the first polarization; the information about the second polarization is used to indicate that the second polarization is a polarization mode of a type different from that of the first polarization; the information about the second polarization is used to indicate an index of the second polarization mode; or the information about the second polarization is used to indicate that the second polarization is a polarization mode the same as the first polarization.

Optionally, in an embodiment, a time offset between a time unit in which the receiving unit 1100 receives the first message and a time unit in which the processing unit 1200 validates the first indication information is L time units, where L is greater than or equal to 0.

Optionally, in an embodiment, the first message further includes second indication information, and the second indication information is used to indicate a time offset L for the processing unit 1200 to validate the first indication information.

Optionally, in an embodiment, the first message includes any one of the following messages: a radio resource control RRC message, a system information block SIB message, downlink control information DCI, and a medium access control control element MAC CE message.

Optionally, the communication apparatus 1000 may further include a sending unit 1300, configured to perform a sending action performed by the terminal device.

Optionally, in an embodiment, the sending unit 1300 is further configured to: before the receiving unit 1100 receives the first message sent by the network device, send a first capability message to the network device, where the first capability message includes a polarization mode supported by the terminal device.

Optionally, in an embodiment, before the sending unit 1300 sends the first capability message to the network device, the receiving unit 1100 is further configured to receive a capability negotiation message sent by the network device, where the capability negotiation message is used to indicate the terminal device to report the polarization mode supported by the terminal device. The sending unit 1300 sends the first capability message to the network device based on the capability negotiation message.

Optionally, in an embodiment, the first indication information is sent upon triggering by an event.

Optionally, in the foregoing implementations, the receiving unit 1100 and the sending unit 1300 may be alternatively integrated into one transceiver unit that has both a receiving function and a sending function. This is not limited herein.

In an implementation, the communication apparatus 1000 may be the terminal device in the method embodiments. In this implementation, the receiving unit 1100 may be a receiver, and the sending unit 1300 may be a transmitter. The receiver and the transmitter may be alternatively integrated into one transceiver. The processing unit 2100 may be a processing apparatus.

In another implementation, the communication apparatus 1000 may be a chip or an integrated circuit mounted in the terminal device. In this implementation, the receiving unit 1100 and the sending unit 1300 may be communication interfaces or interface circuits. For example, the receiving unit 1100 is an input interface or an input circuit, and the sending unit 1300 is an output interface or an output circuit. The processing unit 1200 may be a processing apparatus.

A function of the processing apparatus may be implemented by hardware, or may be implemented by hardware executing corresponding software. For example, the processing apparatus may include at least one processor and at least one memory. The at least one memory is configured to store a computer program. The at least one processor reads and executes the computer program stored in the at least one memory, so that the communication apparatus 1000 performs the operations and/or the processing that the terminal device needs to perform in the method embodiments. Optionally, the processing apparatus may include only a processor, and a memory configured to store a computer program is located outside the processing apparatus. The processor is connected to the memory by using a circuit or a wire, to read and execute the computer program stored in the memory. For another example, the processing apparatus may be a chip or an integrated circuit.

Figure 8:
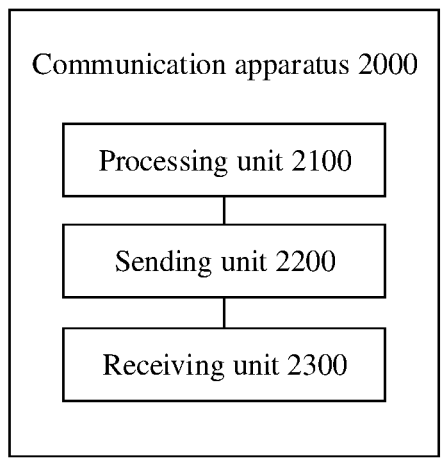
FIG. 8 is a schematic block diagram of a communication apparatus 2000 according to this application.

FIG. 8 is a schematic block diagram of a communication apparatus 2000 according to this application. As shown in FIG. 8, the communication apparatus 2000 includes a processing unit 2100 and a sending unit 2200.

The processing unit 2100 is configured to determine a first message, where the first message includes first indication information, the first indication information includes information about second polarization, the second polarization is a polarization mode the same as or different from first polarization, and the first polarization is a polarization mode in which a terminal device currently operates. The sending unit 2200 is configured to send the first message to the terminal device.

Optionally, in an embodiment, that the first indication information includes information about second polarization includes: The information about the second polarization is used to indicate that the second polarization is a polarization mode orthogonal to the first polarization; the information about the second polarization is used to indicate that the second polarization is a polarization mode of a type different from that of the first polarization; or the information about the second polarization is used to indicate an index of the second polarization mode, where the first polarization is a polarization mode in which the terminal device currently operates.

Optionally, in an embodiment, the first message further includes second indication information, and the second indication information is used to indicate that a time offset between a time unit in which the terminal device receives the first message and a time unit in which the terminal device validates the first indication information is L time units, where L is greater than or equal to 0.

Optionally, in an embodiment, the first message includes any one of the following messages: a radio resource control RRC message, a system information block SIB message, downlink control information DCI, and a medium access control control element MAC CE message.

Optionally, the communication apparatus 2000 may further include a receiving unit 2300, configured to perform a receiving action performed by a network device.

Optionally, in an embodiment, the receiving unit 2300 is configured to: before the sending unit 2200 sends the first message to the terminal device, receive a first capability message sent by the terminal device, where the first capability message includes a polarization mode supported by the terminal device.

Optionally, in an embodiment, before the receiving unit 2300 receives the first capability message sent by the terminal device, the sending unit 2200 is further configured to send a capability negotiation message to the terminal device, where the capability negotiation message is used to indicate the terminal device to report the polarization mode supported by the terminal device. The receiving unit 2300 is configured to receive the first capability message sent by the terminal device based on the capability negotiation message.

Optionally, in an embodiment, the first indication information is sent upon triggering by an event.

Optionally, in the foregoing implementations, the sending unit 2100 and the receiving unit 2300 may be alternatively integrated into one transceiver unit that has both a receiving function and a sending function. This is not limited herein.

In an implementation, the communication apparatus 2000 may be the network device in the method embodiments. In this case, the receiving unit 2300 may be a receiver, and the sending unit 2200 may be a transmitter. The receiver and the transmitter may be alternatively integrated into one transceiver.

In another implementation, the communication apparatus 2000 may be a chip or an integrated circuit in the network device. In this case, the receiving unit 2300 and the sending unit 2200 may be communication interfaces or interface circuits. For example, the receiving unit 2300 is an input interface or an input circuit, and the sending unit 2200 is an output interface or an output circuit. The processing unit 2100 may be a processing apparatus.

The processing unit 2100 may be a processing apparatus. A function of the processing apparatus may be implemented by hardware, or may be implemented by hardware executing corresponding software. For example, the processing apparatus may include at least one processor and at least one memory. The at least one memory is configured to store a computer program. The at least one processor reads and executes the computer program stored in the at least one memory, so that the communication apparatus 2000 performs the operations and/or the processing performed by the network device in the method embodiments. Optionally, the processing apparatus may include only a processor, and a memory configured to store a computer program is located outside the processing apparatus. The processor is connected to the memory by using a circuit or a wire, to read and execute the computer program stored in the memory. For another example, the processing apparatus may be alternatively a chip or an integrated circuit.

Figure 9:
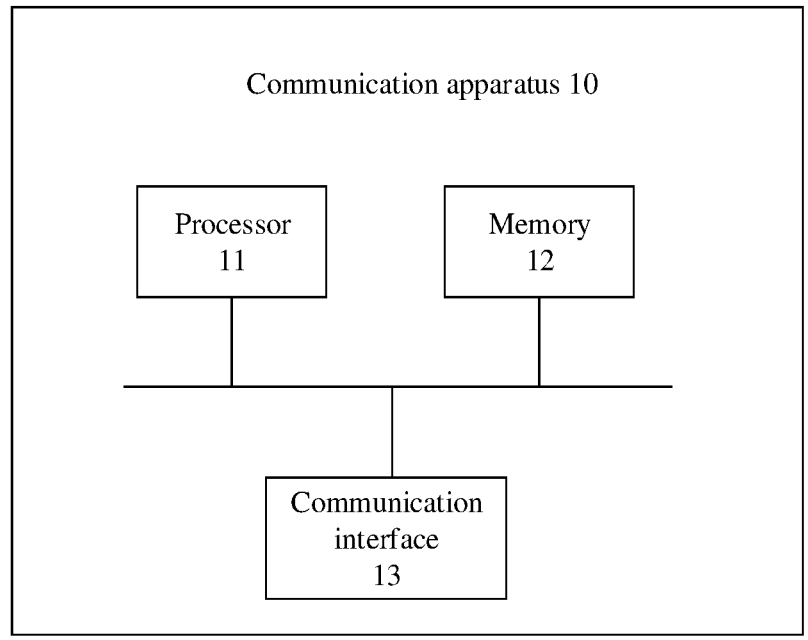
FIG. 9 is a schematic diagram of a structure of a communication apparatus 10 according to this application.

FIG. 9 is a schematic diagram of a structure of a communication apparatus 10 according to this application. As shown in FIG. 9, the communication apparatus 10 includes one or more processors 11, one or more memories 12, and one or more communication interfaces 13. The processor 11 is configured to control the communication interface 13 to send or receive a signal. The memory 12 is configured to store a computer program. The processor 11 is configured to invoke the computer program from the memory 12 and run the computer program, so that the processes and/or the operations performed by the terminal device in the method embodiments of this application are performed.

For example, the processor 11 may have a function of the processing unit 1200 shown in FIG. 7, and the communication interface 13 may have a function of the receiving unit 1100 and/or the sending unit 1300 shown in FIG. 7. Specifically, the processor 11 may be configured to perform the processing or the operations performed by the terminal device in the method embodiments, and the communication interface 13 is configured to perform the sending action and/or the receiving action performed by the terminal device in the method embodiments.

In an implementation, the communication interface 13 in the communication apparatus 10 may be a transceiver. The transceiver may include a receiver and a transmitter. Optionally, the processor 11 may be a baseband apparatus, and the communication interface 13 may be a radio frequency apparatus. In another implementation, the communication apparatus 10 may be a chip or an integrated circuit. In this implementation, the communication interface 13 may be an interface circuit or an input/output interface.

Figure 10:
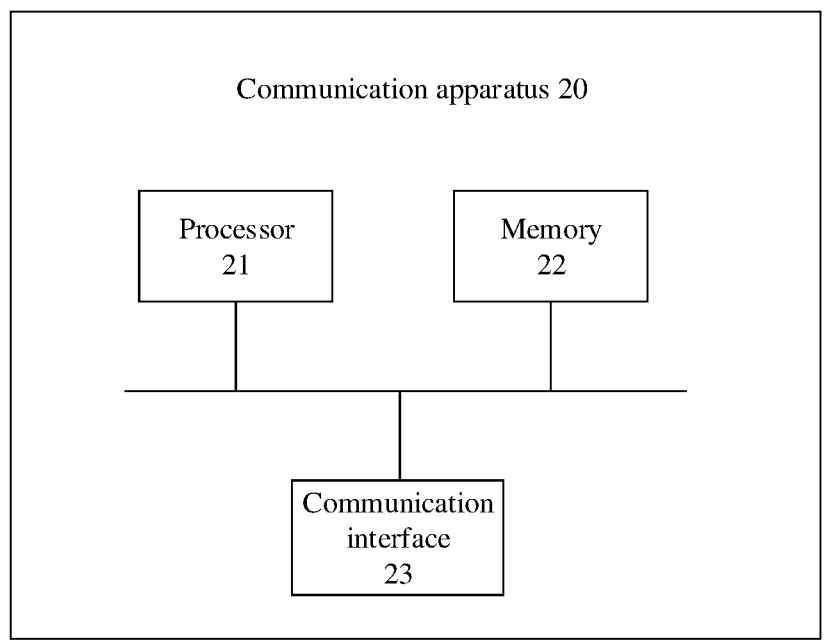
FIG. 10 is a schematic diagram of a structure of a communication apparatus 20 according to this application.

FIG. 10 is a schematic diagram of a structure of a communication apparatus 20 according to this application. As shown in FIG. 10, the communication apparatus 20 includes one or more processors 21, one or more memories 22, and one or more communication interfaces 23. The processor 21 is configured to control the communication interface 23 to send or receive a signal. The memory 22 is configured to store a computer program. The processor 21 is configured to invoke the computer program from the memory 22 and run the computer program, so that the processes and/or the operations performed by the network device in the method embodiments of this application are performed.

For example, the processor 21 may have a function of the processing unit 2100 shown in FIG. 8, and the communication interface 23 may have a function of the receiving unit 2300 and/or the sending unit 2200 shown in FIG. 8. Specifically, the processor 21 may be configured to perform the processing or the operations performed by the network device in the method embodiments, and the communication interface 23 is configured to perform the sending action and/or the receiving action performed by the network device in the method embodiments.

In an implementation, the communication apparatus 20 may be the network device in the method embodiments. In this implementation, the communication interface 23 may be a transceiver. The transceiver may include a receiver and a transmitter. Optionally, the processor 21 may be a baseband apparatus, and the communication interface 23 may be a radio frequency apparatus. In another implementation, the communication apparatus 20 may be a chip or an integrated circuit mounted in the network device. In this implementation, the communication interface 23 may be an interface circuit or an input/output interface.

Optionally, the memory and the processor in the apparatus embodiments may be physically independent units, or the memory and the processor may be integrated together. This is not limited in this specification.

Figure 11:
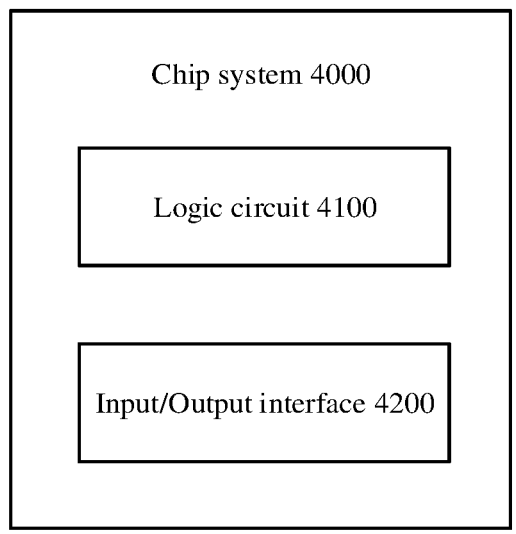
FIG. 11 is a schematic diagram of a chip system according to this application.

FIG. 11 is a schematic diagram of a chip system according to this application. The chip system 4000 shown in FIG. 11 includes a logic circuit 4100 and an input/output interface (input/output interface) 4200. The logic circuit is configured to be coupled to the input interface and transmit data through the input/output interface, to perform the method in FIG. 5.

In addition, this application further provides a computer-readable storage medium. The computer-readable storage medium stores computer instructions. When the computer instructions are run on a computer, the operations and/or the processes performed by the terminal device in the method embodiments of this application are performed.

This application further provides a computer-readable storage medium. The computer-readable storage medium stores computer instructions. When the computer instructions are run on a computer, the operations and/or the processes performed by the network device in the method embodiments of this application are performed.

In addition, this application further provides a computer program product. The computer program product includes computer program code or instructions. When the computer program code or the instructions are run on a computer, the operations and/or the processes performed by the terminal device in the method embodiments of this application are performed.

This application further provides a computer program product. The computer program product includes computer program code or instructions. When the computer program code or the instructions are run on a computer, the operations and/or the processes performed by the network device in the method embodiments of this application are performed.

In addition, this application further provides a chip. The chip includes a processor. A memory configured to store a computer program is disposed separately from the chip. The processor is configured to execute the computer program stored in the memory, so that the operations and/or the processing performed by the terminal device in any method embodiment are performed.

Further, the chip may further include a communication interface. The communication interface may be an input/output interface, an interface circuit, or the like. Further, the chip may further include the memory.

This application further provides a chip. The chip includes a processor. A memory configured to store a computer program is disposed separately from the chip. The processor is configured to execute the computer program stored in the memory, so that the operations and/or the processing performed by the network device in any method embodiment are performed.

Further, the chip may further include a communication interface. The communication interface may be an input/output interface, an interface circuit, or the like. Further, the chip may further include the memory.

In addition, this application further provides a communication system, including the terminal device and the network device in embodiments of this application.

The processor in embodiments of this application may be an integrated circuit chip, and has a signal processing capability. In an implementation process, steps in the foregoing method embodiments may be implemented by using a hardware integrated logic circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps in the methods disclosed in embodiments of this application may be directly presented as being performed and completed by a hardware encoding processor, or performed and completed by a combination of hardware and a software module in an encoding processor. The software module may be located in a storage medium mature in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (Random Access Memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DRRAM). It should be noted that the memory in the systems and methods described in this specification includes but is not limited to these and any memory of another appropriate type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

The term "and/or" in this specification describes only an association relationship for describing associated objects and represents that three relationships may exist. For example, A and/or B may represent the following three cases: Only A exists, both A and B exist, and only B exists. A, B, and C may be singular or plural. This is not limited.

In embodiments of this application, terms such as "first" and "second" are used to distinguish between same items or similar items that have a basically same function and effect. A person skilled in the art may understand that the terms such as "first" and "second" do not limit a quantity or an execution sequence, and the terms such as "first" and "second" do not indicate a definite difference.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a terminal device, a first message sent by a network device, wherein the first message comprises first indication information, wherein the first indication information comprises information about second polarization, wherein the first message further comprises second indication information, and wherein the second indication information indicates a time offset L for the terminal device to validate the first indication information, wherein a time offset between a time unit in which the terminal device receives the first message and a time unit in which the terminal device validates the first indication information is L time units, and wherein L is greater than or equal to 0; and
   switching, by the terminal device, from first polarization to the second polarization based on the first indication information, wherein the first polarization is a polarization mode in which the terminal device operates when the first message is received.

2. The method according to claim 1, wherein:
   the information about the second polarization indicates that the second polarization is a polarization mode orthogonal to the first polarization;
   the information about the second polarization indicates that the second polarization is a polarization mode of a type different from that of the first polarization;
   the information about the second polarization indicates an index of the second polarization; or
   the information about the second polarization indicates that the second polarization is a polarization mode the same as the first polarization.

3. The method according to claim 1, wherein the first message comprises:
   a radio resource control (RRC) message, a system information block (SIB) message, downlink control information (DCI), or a medium access control control element (MAC CE) message.

4. The method according to claim 1, wherein before receiving, by the terminal device, the first message sent by the network device, the method further comprises:
   sending, by the terminal device, a first capability message to the network device, wherein the first capability message comprises a polarization mode supported by the terminal device.

5. The method according to claim 4, wherein before sending, by the terminal device, the first capability message to the network device, the method further comprises:
   receiving, by the terminal device, a capability negotiation message sent by the network device, wherein the capability negotiation message indicates to the terminal device to report the polarization mode supported by the terminal device; and
   sending, by the terminal device, the first capability message to the network device based on the capability negotiation message.

6. An apparatus, comprising:
   a receiver, configured to receive a first message sent by a network device, wherein the first message comprises first indication information, wherein the first indication information comprises information about second polarization, wherein the first message further comprises second indication information, and wherein the second indication information indicates a time offset L for the apparatus to validate the first indication information, wherein a time offset between a time unit in which a terminal device receives the first message and a time unit in which the apparatus validates the first indication information is L time units, and wherein L is greater than or equal to 0;
   a processor; and
   a non-transitory computer readable storage medium storing a program that is executable by the processor, the program including instructions to:
      switch from first polarization to the second polarization based on the first indication information, wherein the first polarization is a polarization mode in which the terminal device operates when the first message is received.

7. The apparatus according to claim 6, wherein:
   the information about the second polarization indicates that the second polarization is a polarization mode orthogonal to the first polarization;
   the information about the second polarization indicates that the second polarization is a polarization mode of a type different from that of the first polarization;
   the information about the second polarization indicates an index of the second polarization; or
   the information about the second polarization indicates that the second polarization is a polarization mode the same as the first polarization.

8. The apparatus according to claim 7, wherein the first message comprises:
   a radio resource control (RRC) message, a system information block (SIB) message, downlink control information (DCI), or a medium access control control element (MAC CE) message.

9. The apparatus according to claim 7, further comprising:
a transmitter, configured to:
before the receiver receives the first message sent by the network device, send a first capability message to the network device, wherein the first capability message comprises a polarization mode supported by the terminal device.

10. The apparatus according to claim 9, wherein:
the receiver is configured to:
before the transmitter sends the first capability message to the network device, receive a capability negotiation message sent by the network device, wherein the capability negotiation message indicates to the terminal device to report the polarization mode supported by the terminal device; and
wherein the transmitter is configured to:
send the first capability message to the network device based on the capability negotiation message.

11. A non-transitory computer readable storage medium storing a program that is executable by at least one processor, the program including instructions for:
receiving a first message sent by a network device, wherein the first message comprises first indication information, wherein the first indication information comprises information about second polarization, wherein the first message further comprises second indication information, and wherein the second indication information indicates a time offset L to validate the first indication information, wherein a time offset between a time unit in which a terminal device receives the first message and a time unit in which to validate the first indication information is L time units, and wherein L is greater than or equal to 0; and
switching from first polarization to the second polarization based on the first indication information, wherein the first polarization is a polarization mode in which the terminal device operates when the first message is received.

12. The non-transitory computer readable storage medium according to claim 11, wherein:
the information about the second polarization indicates that the second polarization is a polarization mode orthogonal to the first polarization;
the information about the second polarization indicates that the second polarization is a polarization mode of a type different from that of the first polarization;
the information about the second polarization indicates an index of the second polarization; or
the information about the second polarization indicates that the second polarization is a polarization mode the same as the first polarization.

13. The non-transitory computer readable storage medium according to claim 11, wherein the first message comprises:
a radio resource control (RRC) message, a system information block (SIB) message, downlink control information (DCI), or a medium access control control element (MAC CE) message.

14. The non-transitory computer readable storage medium according to claim 11, wherein the program further includes instructions for:
sending a first capability message to the network device, wherein the first capability message comprises a polarization mode supported by the terminal device.

* * * * *